(12) United States Patent
Mitchell et al.

(10) Patent No.: US 6,633,046 B1
(45) Date of Patent: Oct. 14, 2003

(54) METHOD AND APPARATUS FOR DETECTING THAT TWO MOVEABLE MEMBERS ARE CORRECTLY POSITIONED RELATIVELY TO ONE ANOTHER

(75) Inventors: Robert Mitchell, Pulborough (GB); James Biddle, Haywards Heath (GB); Ian R. Joyce, Horsham (GB); James Victor Edwards, Selsey (GB)

(73) Assignee: Applied Materials, Inc., Santa Clara, CA (US)

(*) Notice: Subject to any disclaimer, the term of this patent is extended or adjusted under 35 U.S.C. 154(b) by 0 days.

(21) Appl. No.: 09/552,695

(22) Filed: Apr. 19, 2000

(51) Int. Cl.$^7$ .................... G01B 11/14; G01N 21/86
(52) U.S. Cl. .............. 250/492.21; 250/492.3; 250/492.1; 250/492.2; 250/492.22; 250/398; 250/559.25; 356/372; 356/375; 356/399; 356/400; 356/401
(58) Field of Search ................. 356/399, 614, 356/401, 372, 375, 400; 250/492.1, 492.2, 492.21, 492.3, 559.25, 548, 557, 398, 493.1, 492.22

(56) References Cited

U.S. PATENT DOCUMENTS

| | | |
|---|---|---|
| 4,319,406 A | 3/1982 | Pehrson, Sr. et al. |
| 5,278,634 A * | 1/1994 | Skunes et al. ............... 356/399 |
| 5,319,444 A * | 6/1994 | Saitoh et al. ............... 356/375 |
| 5,690,744 A | 11/1997 | Landau |

FOREIGN PATENT DOCUMENTS

| | | |
|---|---|---|
| DE | 4302434 | 4/1994 |
| GB | 967247 | 8/1964 |
| GB | 2025043 | 1/1980 |
| GB | 1470351 | 4/1997 |

* cited by examiner

*Primary Examiner*—John R. Lee
*Assistant Examiner*—David A. Vanore
(74) *Attorney, Agent, or Firm*—Boult Wade Tennant; Joseph Bach

(57) ABSTRACT

The correct handover position between the gripper and the e-chuck is located using a light source and a 2-D photosensor. As the e-chuck is in the loading position it can be driven forwards or backwards in the beam direction by rotating the main whisper scan rotor. The line drawn across the 2-D array by a spot of light from the light source passing through a hole in a flag attached to the e-chuck is recorded. Similarly, the line drawn by a spot of light from the same source passing through a hole in the flag attached to the gripper is also recorded. The point of intersection is the ideal transfer point. For transfer the e-chuck is then driven to this point which can be checked from the 2-D sensor. The gripper is then also driven to the same point and alignment can be checked using the light source and sensor. The hole in the gripper flag may be somewhat smaller than the hole in the e-chuck flag so that proper alignment is assured when the illuminated spot on the 2-D sensor is at the target position for the e-check but has the dimension or total brightness corresponding to the smaller hole of the gripper.

11 Claims, 4 Drawing Sheets

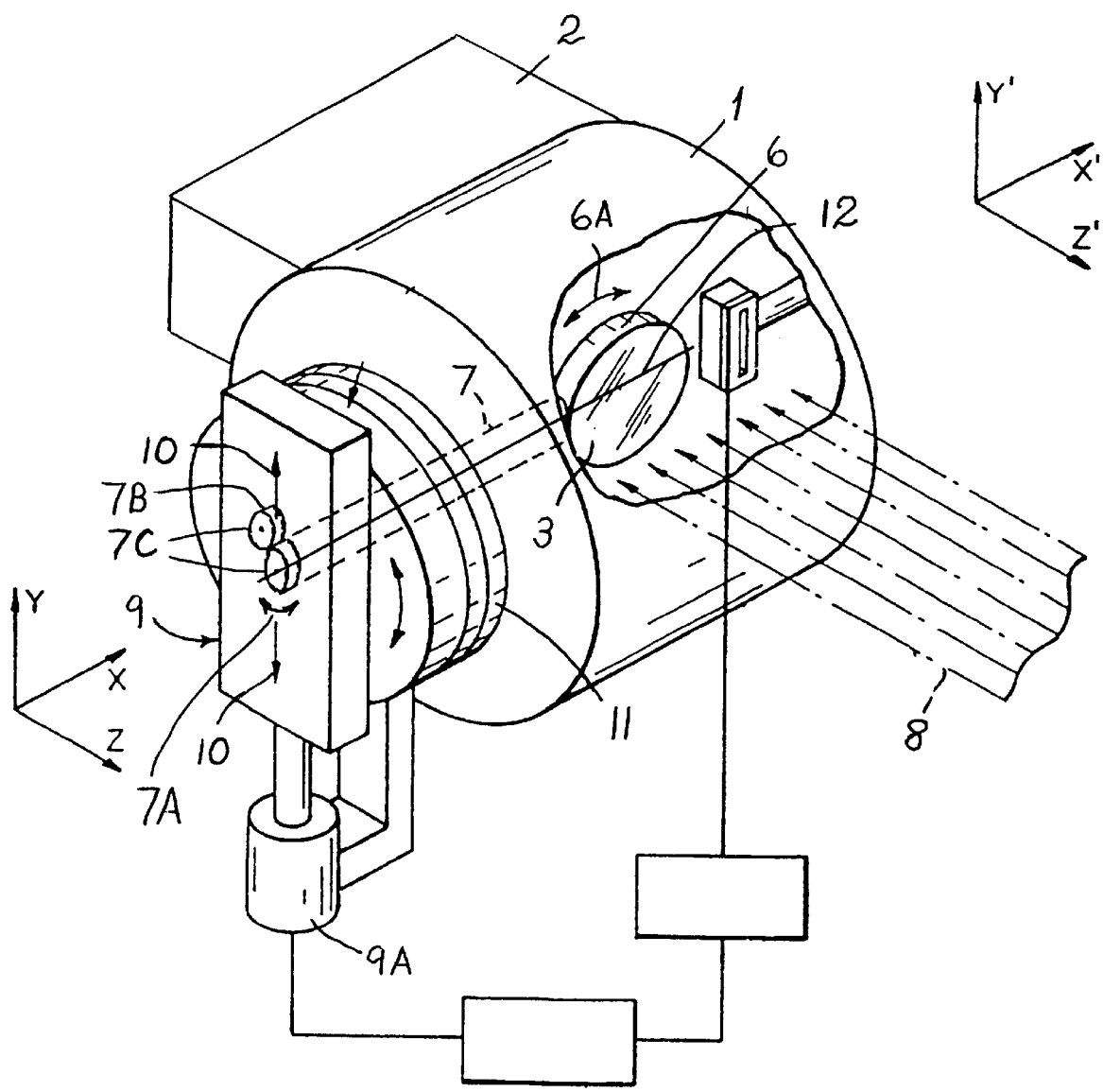
FIG_1

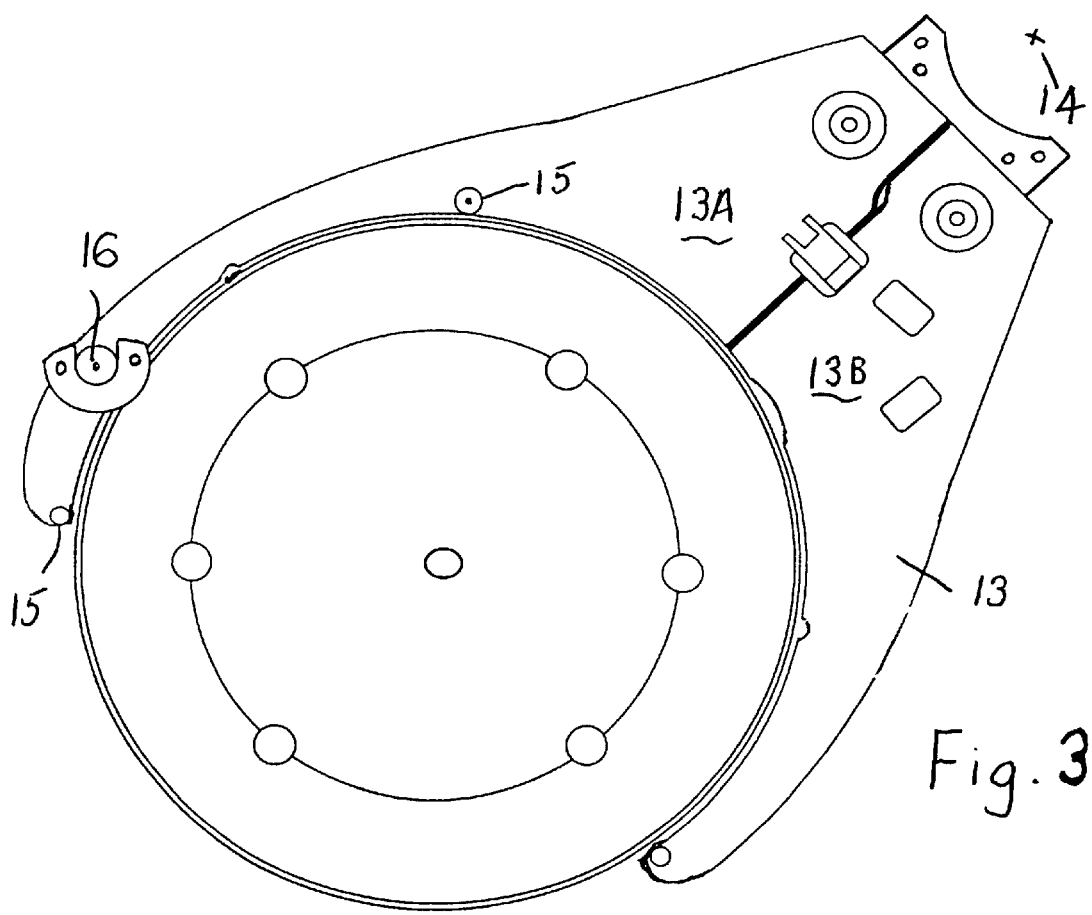
Fig. 3
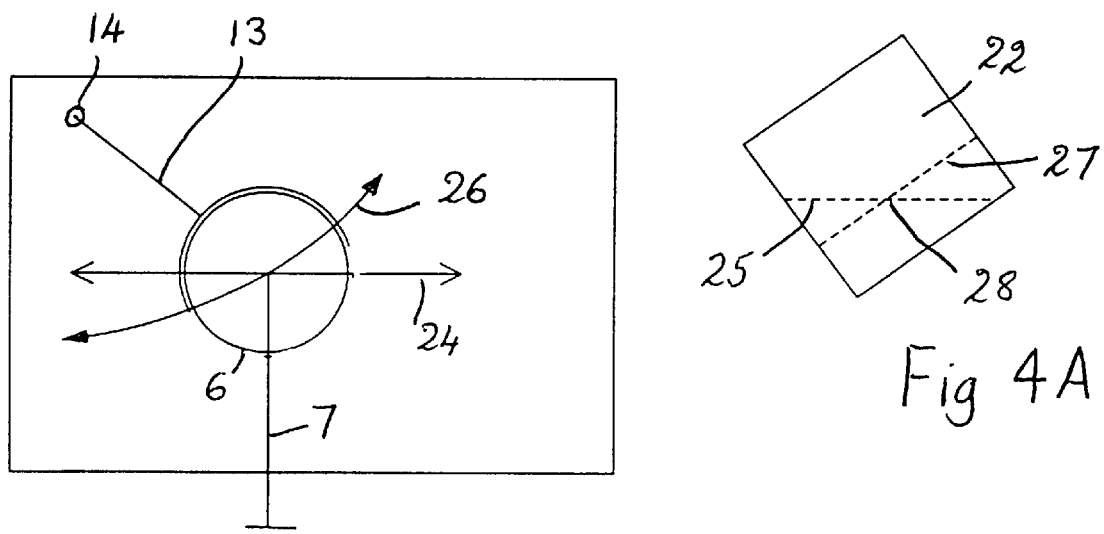
Fig. 4
Fig 4A

METHOD AND APPARATUS FOR DETECTING THAT TWO MOVEABLE MEMBERS ARE CORRECTLY POSITIONED RELATIVELY TO ONE ANOTHER

The present invention relates to a method and apparatus for detecting that two moveable members are correctly positioned relatively to one another.

The invention has a particular application to an ion implantation apparatus in which a single wafer is transferred in a vacuum chamber from a loading mechanism such as loadlock to an electrostatic chuck (hereinafter referred to as an e-chuck) on a gripper arm. The gripper arm also retrieves the wafer from the e-chuck and returns it to the loadlock.

BACKGROUND OF THE INVENTION

Typically, a robot which drives the gripper arm will have between two and four axes of movement. For example, EP 604066 discloses a gripper arm which is axially movable along a vertical axis and rotatable about the same axis.

The e-chuck will typically have several axes of movement, for example, as disclosed in WO 99/13488. In this case the arm which supports the e-chuck extends out of the vacuum chamber and is supported by a linear motion mechanism for reciprocably moving the e-chuck vertically so that the entire surface of a wafer on the e-chuck is scanned by a horizontally scanning ion beam. The linear motion mechanism itself is mounted so as to be rotatable about a horizontal tilt axis which allows the angle between the wafer and the ion beam to be varied. The e-chuck is further provided with a mechanism for rotating the wafer about an axis passing through a centre of the wafer and perpendicular to the plane of the wafer.

Although the mechanisms driving the gripper arm and the e-chuck are provided with encoders which allow them to be driven to a very precise position, the fact that there are so many axes of freedom means that, over time, the mechanisms may drift, particularly as components of the mechanisms start to wear. This results in an imprecise handoff between the gripper arm and e-chuck such that the wafers have to be slid over the surface of the e-chuck causing particulate contaminants on the underside of the wafer. Also, as the encoders cannot provide an absolute position reading they have to be calibrated before use. Such calibration is normally done manually, which can be particularly time consuming and requires a skilled operator.

SUMMARY OF THE INVENTION

According to the present invention there is provided an apparatus for detecting that two moveable members are correctly positioned relatively to one another in a predetermined position, the apparatus comprising a light source, a light sensor onto which light from the light source is projected, and a respective flag on each member which produces a characteristic shadow on the light detector when in the predetermined position, the characteristic shadows of the two members being different from one another.

This apparatus will accurately verify the relative position of the two members, as both members are located with respect to the same light source. As optical sensors are being used, they provide an indication of the absolute position of the two members and are independent of the mechanism driving the two members.

Preferably, the flag on each member is a through hole, with the through hole on one member being larger than the through hole on the other, and wherein the centres of the through holes are aligned in the direction in which the light from the light source travels to the sensor when the members are in the predetermined position. The sensor is preferably a two dimensional position sensitive diode. The light source can be any collimated light source, but is preferably a class 1 modulated infra red laser as the sensor can distinguish between this and ambient light and it also satisfies the necessary safety requirements.

The present invention is particularly applicable to an ion implantation apparatus, wherein the first member is a gripper arm which transfers a wafer within a vacuum chamber from a loading position to a processing position and back, and the second member is an e-chuck on which the wafer is retained while it is scanned by the ion beam. In this case, the flags should be provided on the e-chuck and the gripper arm so as to have a fixed relationship with the wafer position to allow the position of the wafer to be determined easily from the sensor readings. Generally speaking, the e-chuck is brought to the handoff position before the gripper arm. Therefore, when the flags on the two members are provided by through holes, the diameter of the through hole associated with the e-chuck is greater than the diameter of the through hole associated with the gripper arm. When the light source and light sensor are mounted outside the vacuum chamber behind appropriately positioned windows they can be readily removed for maintenance or replacement without requiring access to the vacuum chamber.

When a gripper arm is used which has a pair of jaws which are moveable between open and closed configurations, the gripper arm may be provided with a third flag which produces a third characteristic signal on the light sensor when the gripper arm is in the predetermined position and its jaws are open, allowing the apparatus to determine the configuration of the gripper jaws.

According to a second aspect of the present invention, there is provided a method of detecting that two moveable members are correctly positioned relatively to one another at a predetermined position, the method comprising emitting a beam of light from a light source towards a light sensor, moving each member, so that a flag on each member produces a characteristic shadow on the light detector when in the predetermined position, and detecting that the two members are in the correct alignment when both characteristic shadows are simultaneously recognised on the light sensor.

The present invention also extends to a method of calibrating an apparatus having a pair of moveable arms which are driveable to a handoff position to pass a component from one arm to the other, a position sensitive light sensor, and a light source emitting light towards the light sensor, wherein each arm has a flag which produces its own characteristic signal at the light sensor when interposed between the light source and the light sensor, the method comprising the steps of scanning the first arm across the sensor, recording the readings produced by the first flag across the sensor, scanning the second arm across the sensor, recording the readings produced by the second flag across the sensor, and calculating from the two sets of readings the position where the two flags coincide which represents the handoff position.

This method allows for the automatic calibration of the handoff position which can be done in software. Further, precise positioning of the light source and sensor is unnecessary as any inaccuracies in their positioning are calibrated out using this method.

Preferably, the two moving arms are robot arms driven by one or more servo motors each having an encoder, and the method further comprises noting the encoder readings at the handoff position, and subsequently driving the robot arms to the positions derived from encoder readings at the handoff position, and detecting the signal produced by the sensor at this position. This method allows the position of the arms to be monitored, such that any drift in the position of these arms can be detected.

The present invention further encompasses an apparatus for calibrating and controlling the handoff between a gripper arm and an electrostatic chuck in an ion implantation apparatus, the gripper arm and electrostatic chuck each being driven by a one or more servo motors, the apparatus for calibrating and controlling comprising a computer, an encoder on each servo motor for producing a signal relating to the position of the servo motor and providing this information to the computer, a connection between the computer and a drive mechanism of each servo motor for controlling the motion of each servo motor, and a sensor for receiving light from a light source; the computer having a processor arranged to receive and store values indicative of signals from the encoders and sensor recorded when the gripper arm and electrostatic chuck are at a predetermined handoff position at which the gripper arm and electrostatic chuck intercept a proportion of the light directed to the sensor and produce a characteristic signal at the sensor indicative of the fact that the gripper arm and electrostatic chuck are at the handoff position, to subsequently output a signal to the drive mechanism of each servo motor to drive each servo motor to a position at which the reading from each encoder matches the stored value, and to record the signal from the sensor in this position and compare this value with the stored value.

Preferably the processor is further arranged to determine the drift of the gripper and electrostatic chuck by comparing the stored value of the sensor with each measured value. Preferably the processor is further arranged to alert an operator if the amount of drift detected exceeds a predetermined threshold.

BRIEF DESCRIPTION OF THE DRAWINGS

An example of an ion implantation apparatus incorporating the method and apparatus of the present invention will now be described with reference to the accompanying drawings, in which:

FIG. 1 is a schematic perspective view of the ion implantation apparatus to which the present invention is applied;

FIG. 3 is a plan view showing the gripper and e-chuck;

FIG. 4 is a diagrammatic representation of the calibration process;

FIG. 4A is a diagrammatic view showing the signal produced at the sensor during the calibration process.

DETAILED DESCRIPTION

Figure 1A:
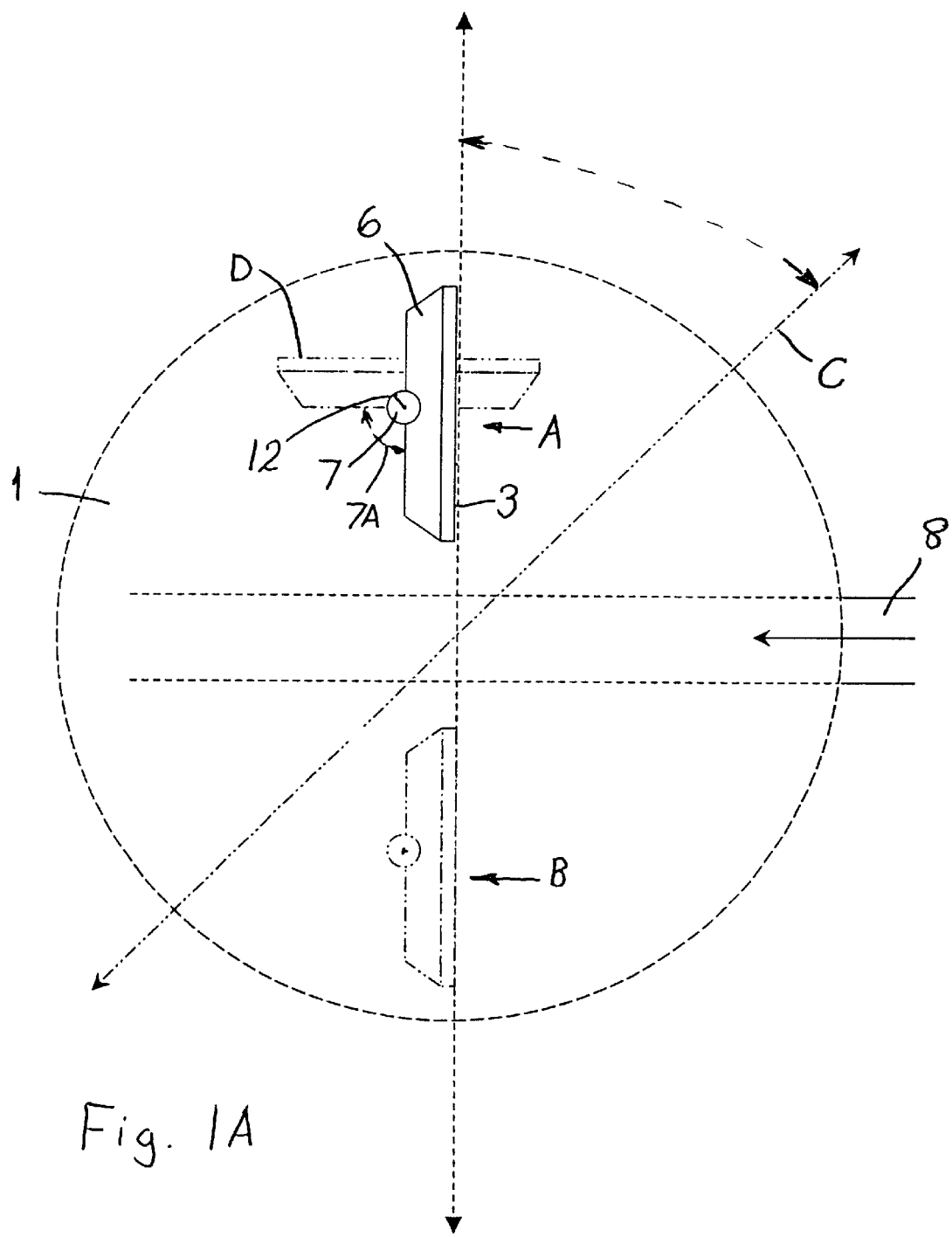
FIG. 1A is a diagrammatic view illustrating the various movements of the electrostatic chuck during operation of the ion implanter.

The vacuum chamber and e-chuck used in the present invention are similar to that disclosed in WO 99/13488, in terms of the scanning motion of the e-chuck.

FIG. 1 illustrates the vacuum chamber and e-chuck, and is similar in most respects to FIG. 1 of WO 99/13488. The carousel for loading the wafers into the vacuum chamber has now been replaced by a loadlock 2 of known construction. It should, however, by appreciated that the carousel of WO 99/13488 can still be used with the present invention.

In this ion implantation apparatus, a wafer 3 is held in position on an e-chuck 6 which is supported at the end of a scan arm 7 and is scanned by a horizontally scanning ion beam 8 which is projected through a window in the vacuum chamber 1.

The scanning arm 7 extends through a vacuum seal in the vacuum chamber 1, and mounted on a plate 9 which is linearly reciprocable in the direction of arrows 10 as shown in FIG. 1 by a linear motor 9A. The plate is driven to move the e-chuck 6 to vertically between the positions shown as A and B in FIG. 1A. The plate 9 and motor 9A are mounted to a rotary bearing 11, allowing the e-chuck 6 to be tilted about a horizontal axis as shown at C in FIG. 1A, thereby varying the angle at which ion beam 8 impinges on the wafer 3 during the scanning operation. The e-chuck 6 is also mounted so as to be rotatable about an axis passing through its centre and perpendicular to the plane of the wafer 3 as shown as arrow 6A in FIG. 1.

As a development of the apparatus of WO 99/13488, the scan arm 7 is rotatably mounted to the plate 9 so as to be rotatable about its elongate axis 12 independently of the plate 9 and rotary bearing 11 as shown by arrow 7A in FIG. 1. The arm is rotated by a motor 7B mounted on plate 9 via gears 7C. This extra degree of freedom allows the plate 9 to be driven to one end of its range of movement, ideally the upper end as shown as A in FIG. 1A, whereupon the arm 7 can be rotated through 90% about the axis 12, such that the e-chuck 6 is now in a horizontal loading configuration which is out of the plane of the beam 8 as shown at D in FIG. 1A.

This horizontal loading forms the subject of our co-pending U.S. Pat. No. 6,207,959 filed on the same say as the present application.

An alternative mechanism where wafers are loaded into an e-chuck in a horizontal configuration forms the subject of a further co-pending U.K. application No. 2,349,269 filed on the same day as the present application. In this case a scanning arm with an e-chuck at one end is rotatably mounted at its other end to the outside of a hub so as to be rotatable about a first axis parallel to a line normal to the wafer bearing surface of the e-chuck. Reciprocating rotation through a limited angle about the first axis scans a wafer on the e-chuck through the ion beam. The hub itself is rotatable about a horizontal second axis perpendicular to the first axis, such that rotation of the hub about this second axis brings the e-chuck from its vertical scanning configuration into a horizontal loading configuration out of the plane of the ion beam. The present invention is equally applicable to loading a wafer on the e-chuck of this apparatus.

A device for conveying the wafers 3 from the loadlock 2 to the e-chuck 6 in its horizontal loading position will now be described with reference to FIGS. 2 and 3.

The subsequent description, refers to the e-chuck only in the horizontal loading position, but it should be appreciated that the scanning operation of the wafer is as described in WO 99/13488.

Figure 2:
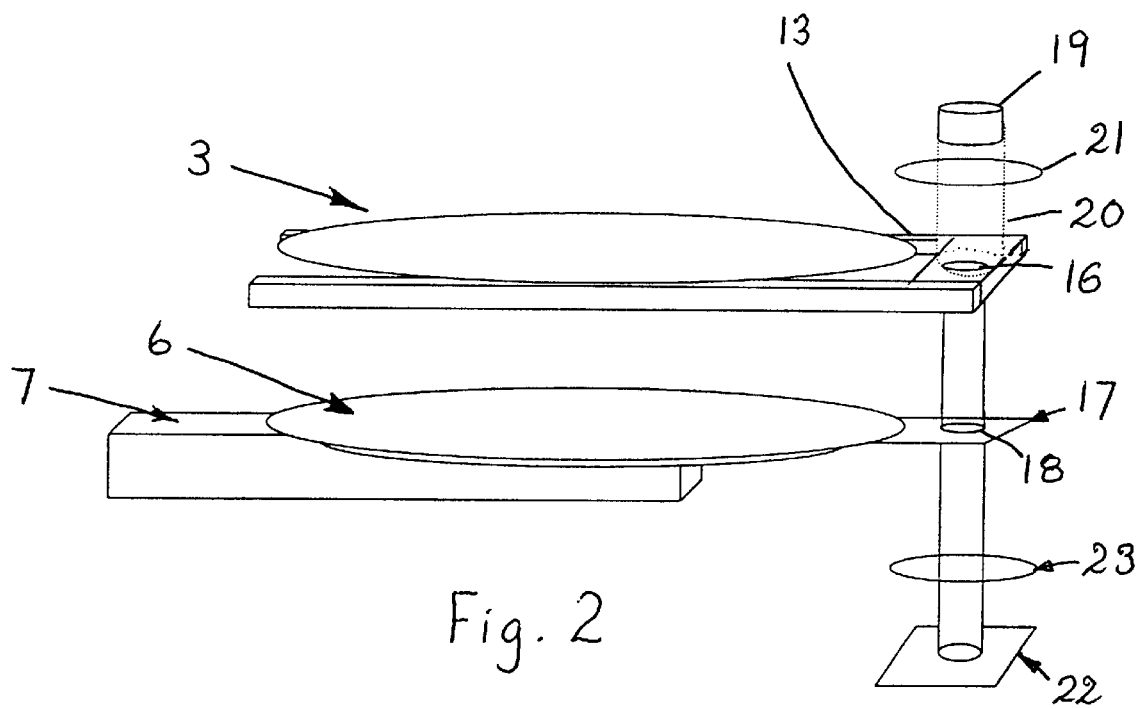
FIG. 2 is a schematic perspective view illustrating the principles of the present invention.

As shown in FIGS. 2 and 3, a gripper arm 13 is provided which is pivotable about a vertical axis 14 so as to transport a wafer 3 between the loading mechanism and a handoff position. The gripper arm 13 comprises a pair of jaws 13A, 13B which are pneumatically operable so as to open and close to pick up and set down the wafer 3 (as shown in outline in FIG. 2). Three fingers 15 are provided around the inner periphery of the gripper to engage the edge of the wafer 3. The gripper arm 13 is provided with a through hole 16 having a 2 mm diameter as shown in FIG. 3 and as illustrated schematically in FIG. 2.

The e-chuck 6 has a flange 17 which projects beyond the wafer receiving portion of the e-chuck and is provided with a through hole 18 which typically has a diameter of 3 mm. The through hole 18 is shown schematically in FIG. 2, and is not shown in FIG. 3 as it is obscured behind the through hole 16 and the gripper arm 13A.

A collimated light source 19, such as a modulated infrared laser, is provided in the outer wall of the vacuum chamber and projects the collimated beam of light 20 into the vacuum chamber through a window 21. A position sensitive two dimensional photodiode 22 is positioned in a wall of the chamber opposite to the light source 19 and receives light from the light source 19 through a window 23.

As can be seen from FIG. 2, with the gripper arm 13 out of the way, when the e-chuck 6 is moved into the predetermined position, the through hole 18 will intercept some of the light from the light source 19, and a signal having a characteristic position and intensity will be detected at the light detector 22. Because the through hole 18 has a fixed relationship with the e-chuck 6, the absolute position of the e-chuck 6 is accurately known. This mechanism can also be used to ensure that the e-chuck 6 is in a horizontal plane as any deviation of the plane of the e-chuck from the horizontal will result in the signal detected by the sensor 22 having an oval, rather than a perfectly circular shape. The mechanism driving the scanning arm 7 can then be adjusted to return the chuck 6 to the correct horizontal orientation at which the sensor records a perfectly circular spot of light.

With the e-chuck 6, remaining in place, the gripper arm 13 is brought into position as shown in FIG. 2. As the hole 16 intercepts more of the light than the hole 18, the sensor 22 will detect a signal which indicates the same position as before, but at a reduced intensity. As the wafer 3 is gripped by the three fingers 15, it will be positioned at a fixed relationship with respect to the through hole 16. It is therefore possible to determine the exact position of the wafer 3, and to verify that this is now directly above the e-chuck 6.

The relative elevational separation between the wafer 3 and the e-chuck 6 can be determined using a further sensor. The gripper arm 13 can then be moved vertically along the axis 14 to lower the wafer onto the e-chuck 6. Once the wafer 3 is lowered into position, the gripper arm 13 opens releasing the wafer 3. The gripper arm 13A is provided with a second through hole (not shown) having a smaller diameter (typically 1.5 mm) than the first through hole. This second through hole will be brought into alignment with the through hole 18 in the e-chuck when the gripper arm opens. As a result of this, the sensor 22 will detect a signal of even lower intensity than that detected with the gripper arm closed, so that it can verify that the gripper arm has been correctly opened.

As the gripper arm 13 and e-chuck 6 are driven by robots having a number of axes of motion, each of which is driven by a servo motor having a rotary encoder, it is necessary to calibrate the apparatus prior to use. The calibration process will now be described with particular reference to FIGS. 4 and 4A.

Figure 5:
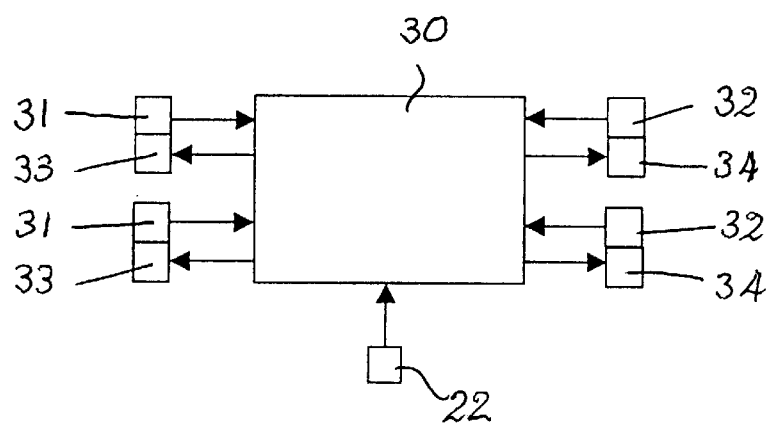
FIG. 5 is a schematic diagram showing the controlling mechanism of the apparatus.

With the gripper arm 13 out of the way, the scan arm 7 is driven across the vacuum chamber in the direction of arrow 24. At this time, the e-chuck 6 is maintained in its horizontal configuration. This is achieved by rotating the rotary bearing 11 about its axis, while moving the plate 9 to keep the e-chuck at the correct height, and rotating the scan arm 7 about the axis 12 in order to maintain the e-chuck 6 in its horizontal orientation. This movement will produce a horizontal trace across the sensor 22 as represented schematically by line 25 in FIG. 4A. This information is stored in the memory of a computer 30 as shown in FIG. 5. The e-chuck 6 is moved out of the way and a similar process is repeated for the gripper arm 13, which is moved about axis 14 along the arc shown as arrow 26 in FIG. 4. This motion produces an arcuate trace on the sensor 22 shown as line 27 in FIG. 4A. This data is also stored in the memory of computer 30.

The computer 30 then calculates from this data the point 28 at which the two traces 25, 27 intersect. The values from the encoders 31 driving the gripper arm 13 and the encoders 32 driving the scan arm 7 are also recorded at this position.

During operation, the motors 33 driving the gripper arm 13 and the motors 34 driving the scan arm 7 are driven to the recorded values of the encoders 31, 32 necessary to bring the two arms to a position in which the through holes 16, 18 are above the handover position 28. At this position, as there is a fixed relationship between the through hole 16 and the wafer 3, and between the through hole 18 and the e-chuck 6, the wafer 3 will always be directly above the e-chuck 6. Each time the arms are driven to the handover position, the computer 30 checks the reading from the sensor 22 to verify that the two arms are indeed in the correct position. This allows any misalignment of the arm to be detected by the computer independently of the mechanism driving the two arms. A degree of drift can occur while still remaining in the tolerance allowed for the handoff position. This drift is monitored by the computer 30 as it provides useful diagnostic information.

What is claimed is:

1. An ion implantation apparatus having a gripper arm which, in use, transfers a wafer within a vacuum chamber between a loading position and a processing position, and an e-chuck on which, in use, the wafer is retained while it is scanned by an ion beam, and including apparatus for detecting that said gripper arm and said e-chuck are correctly positioned relatively to one another in a predetermined position, said detecting apparatus comprising a light source, a light sensor onto which light from the light source is projected, in use, and a respective flag on each of said gripper arm and said e-chuck, each said flag producing, in use, a characteristic shadow on the light detector when the gripper arm and the e-chuck are in the predetermined position, the characteristic shadows of the flags being different from one another.

2. An apparatus according to claim 1, wherein each flag is a through hole, with the through hole of one flag being larger than the through hole on the other, and wherein the centers of the through holes are aligned in the direction in which the light from the light travels to the sensor when the members are in the predetermined position.

3. An apparatus according to claim 1, wherein the sensor is a two dimensional position sensitive diode.

4. An apparatus according to claim 1, wherein the light source is a class 1 modulated infra red laser.

5. An apparatus according to claim 1, wherein the flags on the e-chuck and the gripper arm have a fixed relationship with the wafer position.

6. An apparatus according to claim 2, wherein the diameter of the through hole associated with the e-chuck is greater than the diameter of the through hole associated with the gripper arm.

7. An ion implantation apparatus according to claim 1, wherein the light source and light sensor are mounted outside the vacuum chamber behind appropriately positioned windows.

8. An apparatus according to claim 1, wherein the gripper arm has jaws which close to hold a wafer and has a third flag which produces a third characteristic shadow on the light sensor when the gripper arm is in the predetermined position and its jaws are open.

9. A method of calibrating an apparatus having a pair of moveable arms which are driveable to a handoff position to pass a component from one arm to the other, a position sensitive light sensor, and a light source emitting light towards the light sensor, wherein each arm has a flag which produces its own characteristic signal at the light sensor when interposed between the light source and the light sensor, the method comprising the steps of scanning the first arm across the sensor, recording the readings produced by the first flag across the sensor, scanning the second arm across the sensor, recording the readings produced by the second flag across the sensor, and calculating from the two sets of readings the position where the two flags coincide which represents the handoff position.

10. A method according to claim 9, wherein the two moveable arms are robot arms driving by one or more servo motors each having an encoder, and the method further comprises noting the encoder readings at the handoff position, and subsequently driving the robot arms the positions derived from encoder readings at the handoff position, and detecting the signal produced by the sensor at this position.

11. A method of operating ion implantation apparatus having a gripper arm for transferring a wafer within a vacuum chamber between a loading position and a processing position and an e-chuck to retain the wafer while it is scanned by an ion beam, the method being for detecting that the gripper arm and the e-chuck are correctly positioned relatively to one another at a predetermined position, and comprising emitting a beam of light from a light source towards a light sensor, moving the gripper arm and the e-chuck so that a flag on each of them produces a characteristic shadow on the light detector when in the predetermined position, and detecting that the gripper arm and the e-chuck are in the correct alignment when both characteristic shadows are simultaneously recognized on the light sensor.

* * * * *